(12) United States Patent
Elder

(10) Patent No.: US 9,538,743 B2
(45) Date of Patent: Jan. 10, 2017

(54) MULTIDIRECTIONAL WINDSOCK STYLE DECOY

(71) Applicant: Charles Elder, James Creek, PA (US)

(72) Inventor: Charles Elder, James Creek, PA (US)

(\*) Notice: Subject to any disclaimer, the term of this patent is extended or adjusted under 35 U.S.C. 154(b) by 117 days.

(21) Appl. No.: 14/316,295

(22) Filed: Jun. 26, 2014

(65) Prior Publication Data

US 2015/0000174 A1 Jan. 1, 2015

Related U.S. Application Data

(60) Provisional application No. 61/839,706, filed on Jun. 26, 2013.

(51) Int. Cl.
*A01M 31/06* (2006.01)

(52) U.S. Cl.
CPC ..................... *A01M 31/06* (2013.01)

(58) Field of Classification Search
CPC ............ A01M 31/06; B64F 1/18; G01P 13/02
USPC ..... 43/3, 2; 73/170.05, 170.01; 40/412, 422, 40/439, 477; 446/176, 199, 201
See application file for complete search history.

(56) References Cited

U.S. PATENT DOCUMENTS

| | | | | |
|---|---|---|---|---|
| 1,401,626 A * | 12/1921 | Mader | ..................... | G09F 17/00 73/170.05 |
| 1,736,109 A * | 11/1929 | Barton | ..................... | B64F 1/18 73/170.05 |
| 1,742,574 A * | 1/1930 | Breedlove | ................. | B64F 1/18 73/170.06 |
| 1,855,005 A * | 4/1932 | Wiefelsputz | ........... | A63H 13/02 446/199 |
| 2,492,371 A * | 12/1949 | Sivian | ....................... | G01P 5/24 73/170.13 |
| 2,787,074 A * | 4/1957 | Miller | .................... | A01M 31/06 43/3 |
| 2,947,104 A * | 8/1960 | Johnson | ................ | A01M 31/06 43/3 |
| 3,071,892 A * | 1/1963 | Clark | ....................... | A63H 3/06 40/215 |
| 3,220,253 A * | 11/1965 | Parker | ....................... | G01P 5/06 446/199 |
| 3,470,645 A * | 10/1969 | Mattson | ................ | A01M 31/06 43/3 |

(Continued)

FOREIGN PATENT DOCUMENTS

CA 2347341 A1 * 1/2002 ............ A01M 31/06
CA 2414245 A1 * 6/2003

(Continued)

*Primary Examiner* — Darren W Ark
(74) *Attorney, Agent, or Firm* — Dunlap Bennett & Ludwig PLLC

(57) ABSTRACT

A multidirectional windsock style decoy may include a body bag having a decoy head hole along a front end, a wind entry hole along a side, and an interior housing. A stay open collar may keep the wind entry hole open. The decoy may further include a back support having a top side, a bottom side, a front face and a back side a decoy head having a back side. The back side of the decoy head may connect to the front face of the back support. The decoy head may close off the decoy head hole. At least one side support may connect to the top side and the bottom side of the back support. The side support may extend out towards the stay open collar. A stake may be connected to the body bag and secured in place at a particular height off the ground.

10 Claims, 5 Drawing Sheets

(56) References Cited

U.S. PATENT DOCUMENTS

| | | | | |
|---|---|---|---|---|
| 3,964,190 A * | 6/1976 | Leo | F16C 39/063 | |
| | | | 40/412 | |
| 4,062,141 A * | 12/1977 | Shjeflo | A01M 31/06 | |
| | | | 43/3 | |
| 4,172,335 A * | 10/1979 | Farmer | A01M 31/06 | |
| | | | 43/3 | |
| 4,475,674 A * | 10/1984 | Farmer | A01M 31/06 | |
| | | | 43/3 | |
| 4,611,421 A * | 9/1986 | Jacob | A01M 31/06 | |
| | | | 43/3 | |
| 4,651,457 A * | 3/1987 | Nelson | A01M 31/06 | |
| | | | 43/3 | |
| 4,753,028 A * | 6/1988 | Farmer | A01M 31/06 | |
| | | | 43/3 | |
| 4,928,418 A * | 5/1990 | Stelly | A01M 31/06 | |
| | | | 43/3 | |
| 4,972,620 A * | 11/1990 | Boler | A01M 31/06 | |
| | | | 43/3 | |
| 5,085,075 A * | 2/1992 | Baker | G01P 13/02 | |
| | | | 73/170.05 | |
| 5,144,764 A * | 9/1992 | Peterson | A01M 31/06 | |
| | | | 43/3 | |
| 5,172,506 A * | 12/1992 | Tiley | A01M 31/06 | |
| | | | 43/3 | |
| 5,595,012 A * | 1/1997 | Coleman | A01M 31/06 | |
| | | | 43/3 | |
| 6,050,017 A * | 4/2000 | Barry | A01M 31/06 | |
| | | | 43/2 | |
| 6,092,322 A * | 7/2000 | Samaras | A01M 31/06 | |
| | | | 43/2 | |
| 6,349,902 B1 * | 2/2002 | Cripe | A63H 27/08 | |
| | | | 43/3 | |
| 6,374,530 B1 * | 4/2002 | Mierau | A01M 31/06 | |
| | | | 43/3 | |
| 6,381,896 B1 * | 5/2002 | Coker | A01M 31/06 | |
| | | | 43/3 | |
| 6,385,895 B1 * | 5/2002 | Scaries | A01M 31/06 | |
| | | | 43/2 | |
| 6,481,147 B2 * | 11/2002 | Lindaman | A01M 31/06 | |
| | | | 43/2 | |
| 6,678,979 B2 * | 1/2004 | Lim | G09F 19/08 | |
| | | | 40/412 | |
| 6,745,510 B1 * | 6/2004 | Coker | A01M 31/06 | |
| | | | 43/3 | |
| 7,028,429 B1 * | 4/2006 | Druliner | A01M 31/06 | |
| | | | 43/3 | |
| 7,481,017 B1 * | 1/2009 | Bocchi | A01M 31/06 | |
| | | | 43/3 | |
| 7,493,723 B2 * | 2/2009 | Hess | A01M 31/06 | |
| | | | 43/3 | |
| 7,975,423 B2 * | 7/2011 | Brestal | A01M 31/06 | |
| | | | 43/3 | |
| 9,149,032 B2 * | 10/2015 | Mettler | A01M 31/06 | |
| 2002/0017047 A1 * | 2/2002 | Mierau | A01M 31/06 | |
| | | | 43/3 | |
| 2006/0053675 A1 * | 3/2006 | Lindaman | A01M 31/06 | |
| | | | 43/2 | |
| 2013/0283664 A1 * | 10/2013 | Kelly | A01M 31/06 | |
| | | | 43/3 | |
| 2015/0027028 A1 * | 1/2015 | Steinberg | A01M 31/06 | |
| | | | 43/2 | |
| 2016/0021871 A1 * | 1/2016 | Holste | G01P 13/02 | |
| | | | 43/3 | |
| 2016/0066562 A1 * | 3/2016 | Boudwin | A01M 31/06 | |
| | | | 43/2 | |

FOREIGN PATENT DOCUMENTS

| | | | | |
|---|---|---|---|---|
| DE | EP 1426769 A2 * | 6/2004 | | G01P 13/02 |
| FR | 848634 A * | 11/1939 | | A01M 31/06 |
| FR | 2622299 A3 * | 4/1989 | | G01P 13/02 |
| FR | 2860074 A1 * | 3/2005 | | B64F 1/18 |
| GB | 1454523 A * | 11/1976 | | A01M 31/06 |
| GB | 2189124 A * | 10/1987 | | A01M 31/06 |
| SE | WO 9740390 A1 * | 10/1997 | | G01P 1/08 |

* cited by examiner

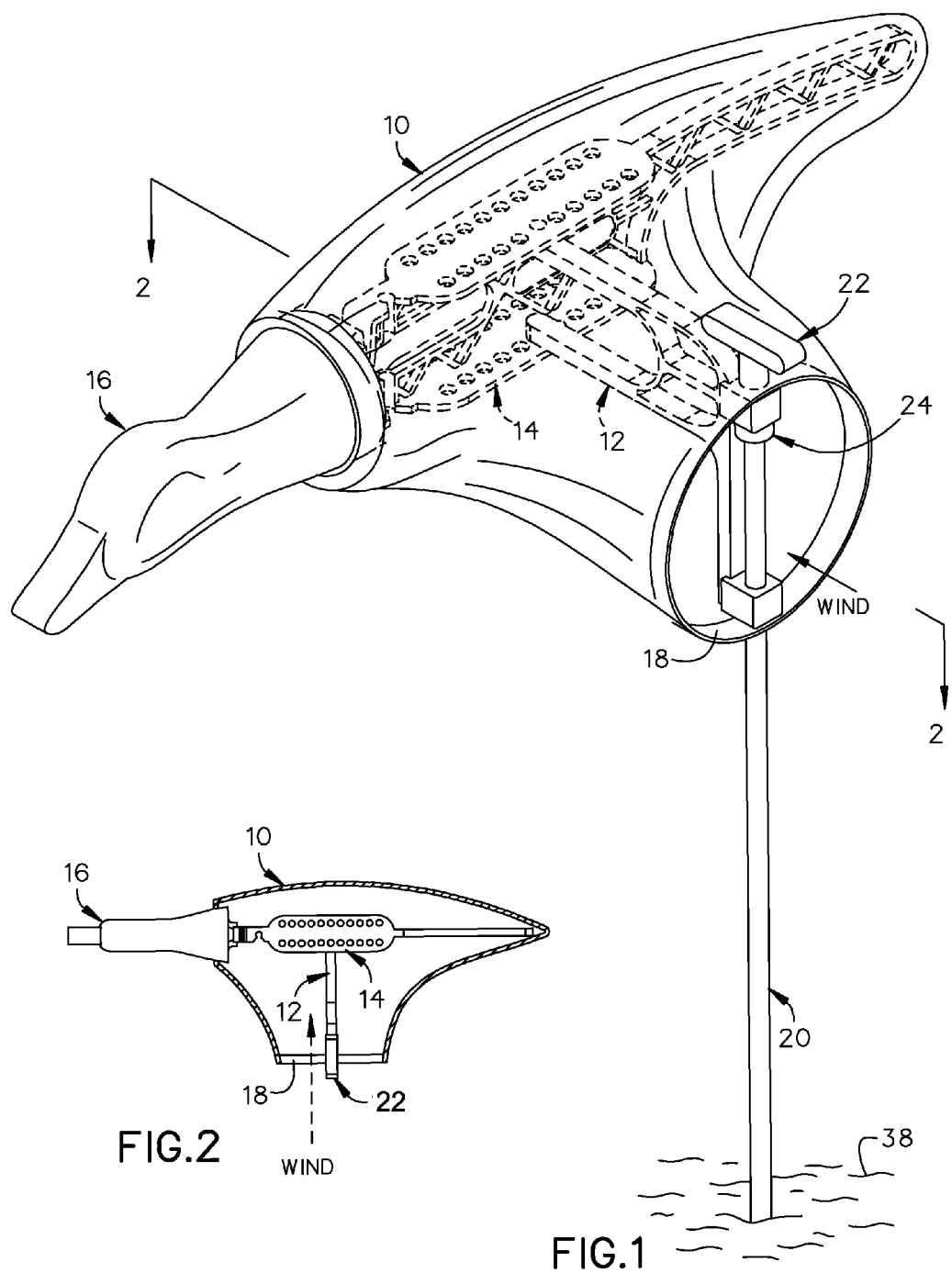

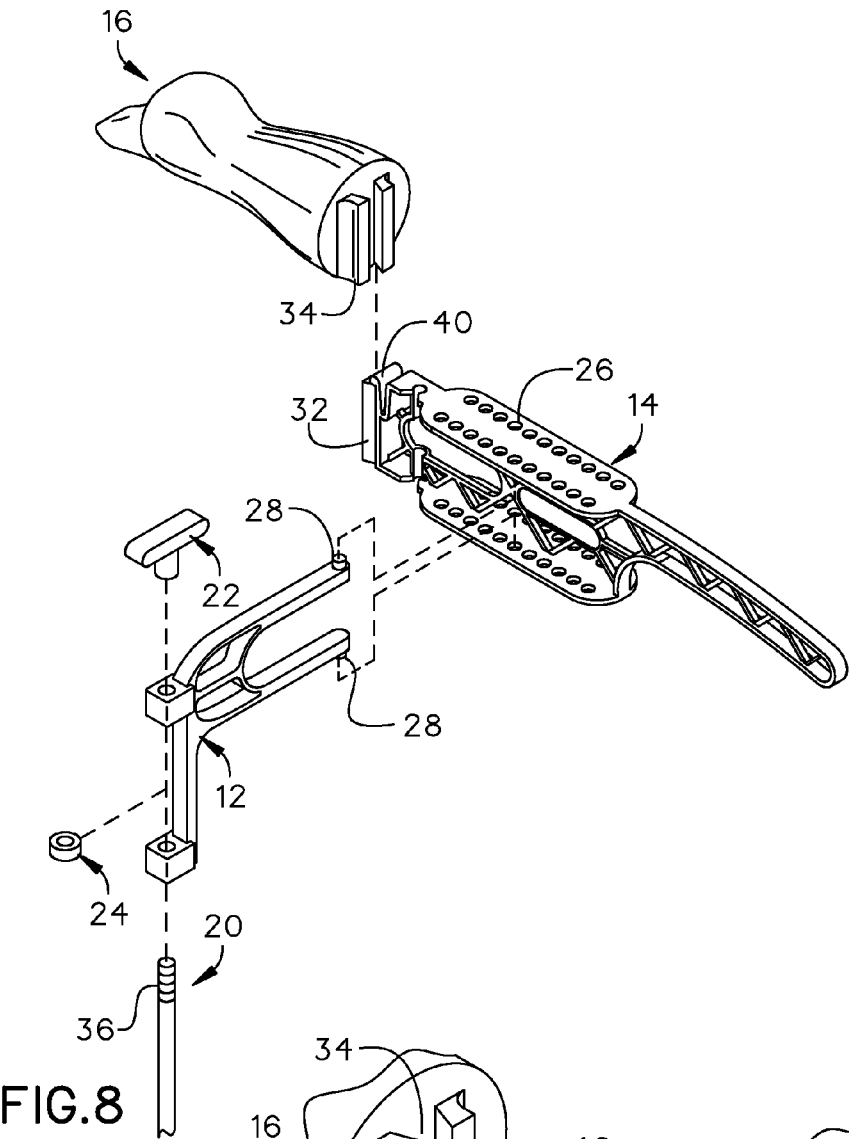
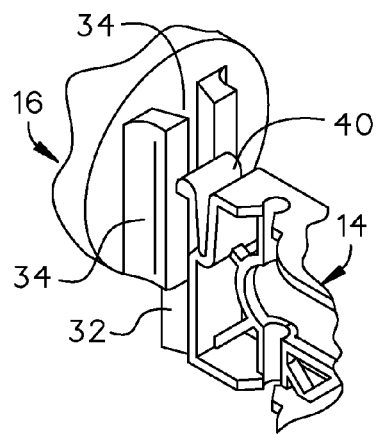
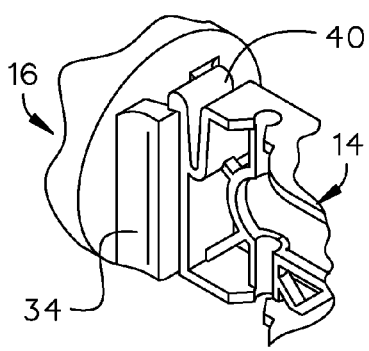

MULTIDIRECTIONAL WINDSOCK STYLE DECOY

CROSS-REFERENCE TO RELATED APPLICATION

This application claims the benefit of U.S. provisional application No. 61/839,706, filed Jun. 26, 2013, the contents of which are herein incorporated by reference.

BACKGROUND OF THE INVENTION

The present invention relates to windsock decoys and, more particularly, to windsock decoys faced other than parallel to the wind.

Currently, windsock decoy spreads all look unnatural in that the decoys all face into the wind in the same direction unlike a natural flock of waterfowl that face in various directions. These windsock decoys, which all point in the same direction, appear unnatural to the large flocks of geese being lured and they become wary of the lines of decoys. The decoy head is generally placed above the wind entry hole of a body bag.

As can be seen, there is a need for a windsock decoy that positions in various directions other than just parallel with the wind creating a more natural appearance of a flock of feeding birds.

SUMMARY OF THE INVENTION

In one aspect of the present invention, a multidirectional windsock style decoy comprises: a body bag having a front end, a wind entry hole along a side, and an interior housing; and a stake attached to the wind entry hole along the side of the body bag.

In another aspect of the present invention, a method for luring waterfowl to an area comprises: placing at least one multidirectional windsock style decoy into a spread of decoys, wherein the multidirectional windsock style decoy comprises a body bag having a front end, a wind entry hole along a side, and an interior housing; and a stake attached to the wind entry hole along the side of the body bag; and placing the multidirectional windsock style decoy to receive the air from the wind through the wind entry hole, wherein a line from the front end to the back end of the multidirectional windsock style decoy is other than parallel to the direction of the wind, wherein the multiple decoys are directed to different angles randomly throughout the spread of decoys.

These and other features, aspects and advantages of the present invention will become better understood with reference to the following drawings, description and claims.

BRIEF DESCRIPTION OF THE DRAWINGS

FIG. 1 is a perspective view of an exemplary embodiment of the present invention shown in use;

FIG. 2 is a section view of an exemplary embodiment of the present invention take along line 2-2 in FIG. 1;

FIG. 8 is a rear perspective exploded view of an exemplary embodiment of the present invention omitting the body bag for illustrative clarity;

FIG. 9 is a detailed view of an exemplary embodiment of the present invention demonstrating a decoy head dovetail slot halfway interfacing with a back support dovetail nub; and FIG. 10 is a detailed view of an exemplary embodiment of the present invention demonstrating a decoy head dovetail slot fully interfacing with a back support dovetail nub

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a multidirectional windsock style decoy that may include a body bag having a decoy head hole along a front end, a wind entry hole along a side, and an interior housing. A stay open collar may keep the wind entry hole open. The decoy may further include a back support having a top side, a bottom side, a front face and a back side a decoy head having a back side. The back side of the decoy head may connect to the front face of the back support. The decoy head may close off the decoy head hole. At least one side support may connect to the top side and the bottom side of the back support. The side support may extend out towards the stay open collar. A stake may be connected to the body bag 10 and secured in place at a particular height off the ground.

Figure 3:
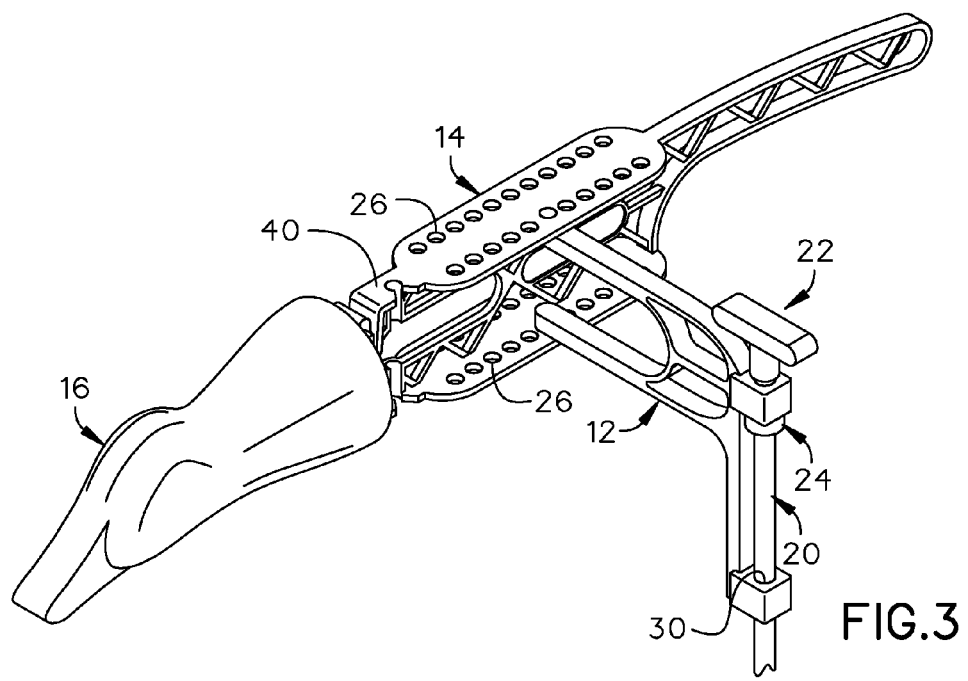
FIG. 3 is a front perspective detail view of an exemplary embodiment of the present invention omitting the body bag for illustrative clarity.
Figure 4:
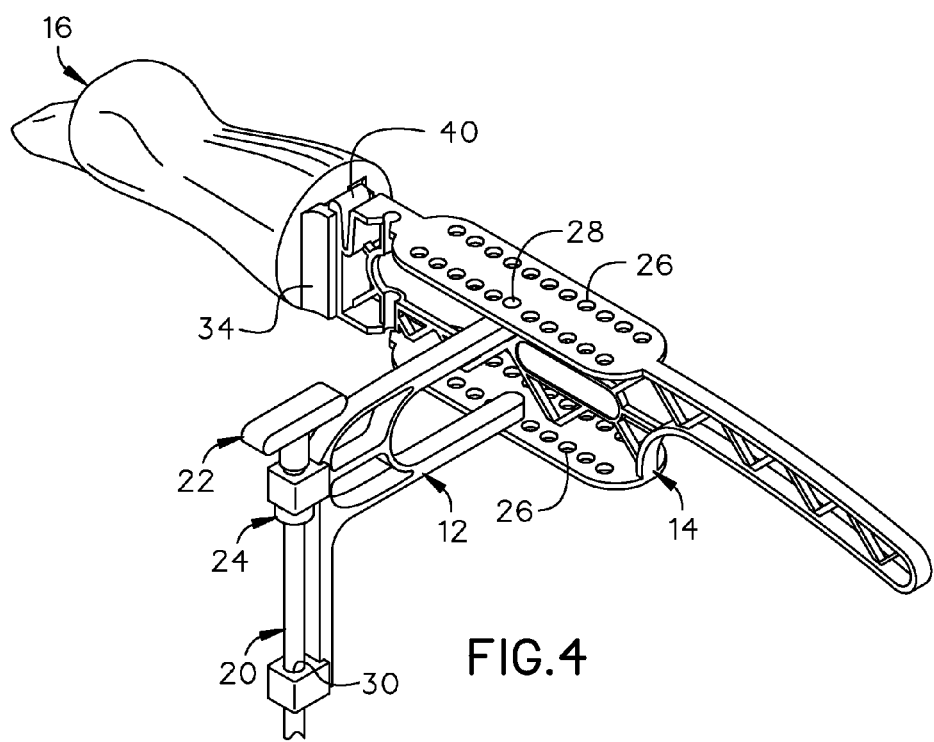
FIG. 4 is a rear perspective detail view of an exemplary embodiment of the present invention omitting the body bag for illustrative clarity.
Figure 5:
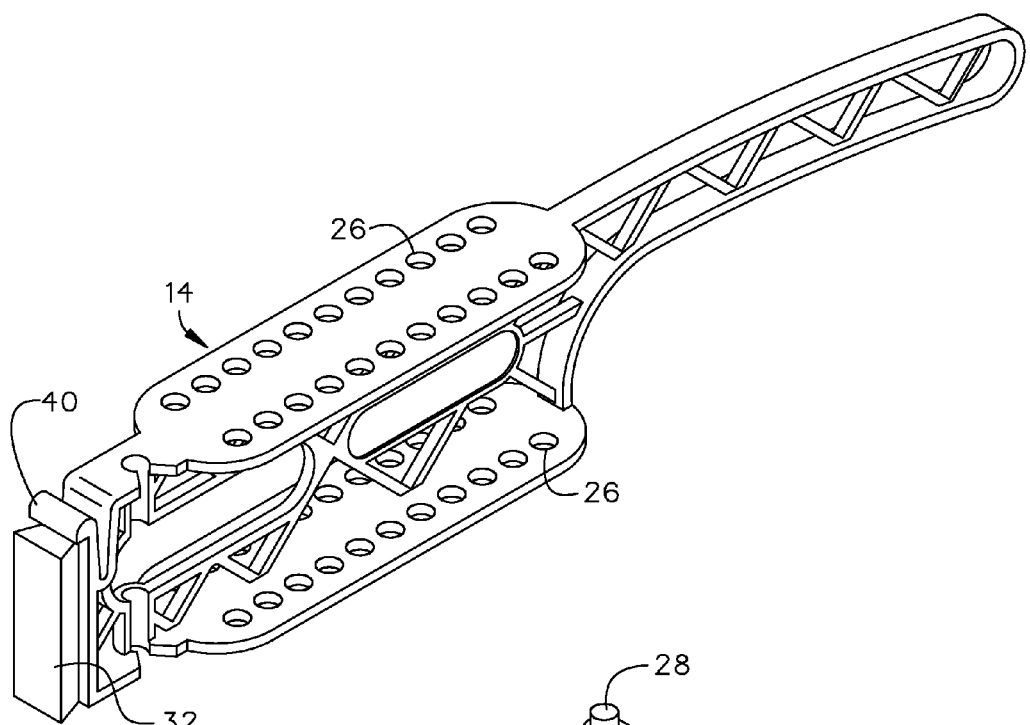
FIG. 5 is a perspective view of a back support of an exemplary embodiment of the present invention.
Figure 6:
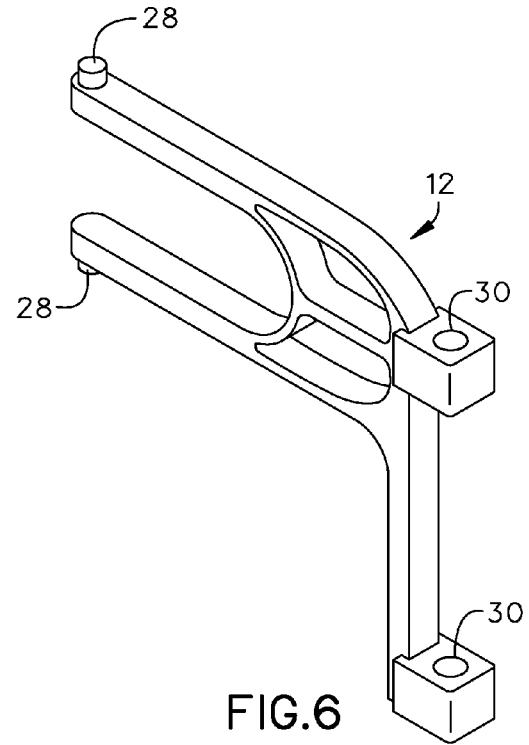
FIG. 6 is a perspective view of a side support of an exemplary embodiment of the present invention.
Figure 7:
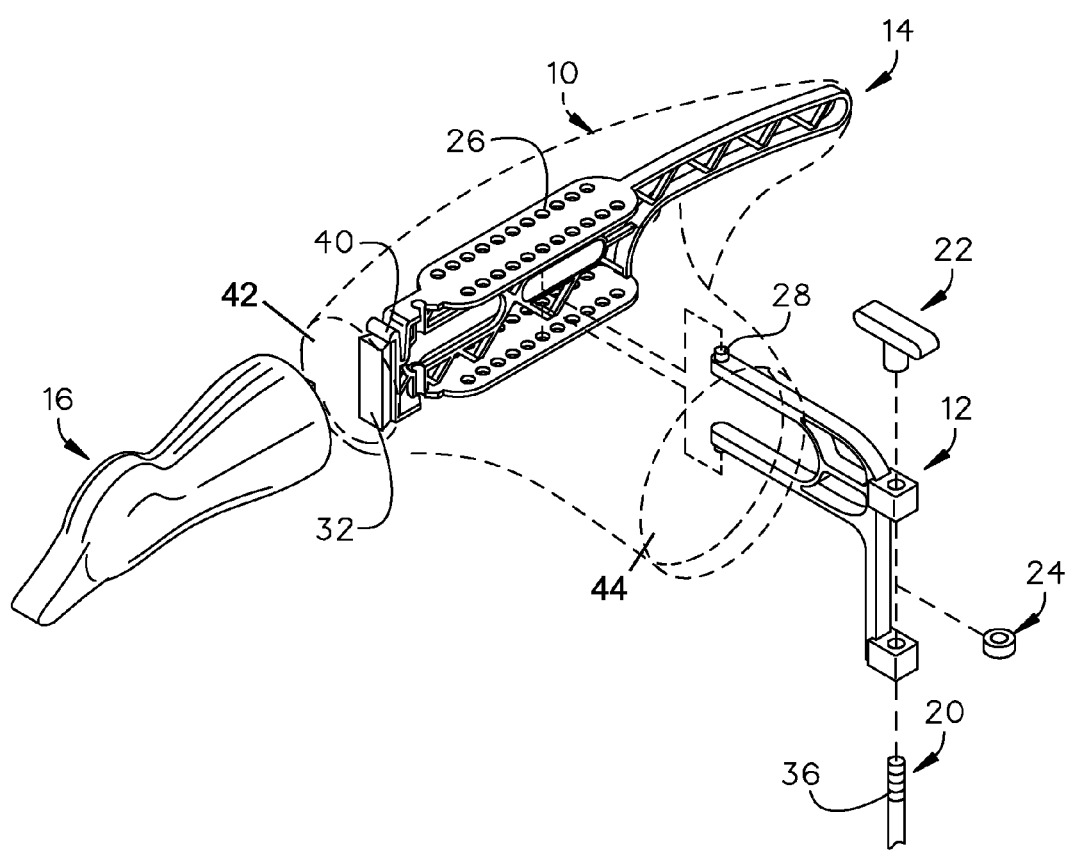
FIG. 7 is a front perspective exploded view of an exemplary embodiment of the present invention demonstrated with a body bag.

As is illustrated in FIGS. 1 through 6, the present device may include a body bag 10. The body bag 10 may be sewn having a wind entry hole 44 having an inner perimeter sewn into a side of the body bag 10. In certain embodiments, a decoy head hole 42 may be sewn along a front end of the body bag 10. The decoy head hole 42 may be snug fitting, elasticized, or the like. A decoy head 16 may be placed within the decoy head hole 42 along a front end of the body bag 10. A seal may be maintained between the decoy head hole 42 and the decoy head 10. The decoy head 16 may connect to at least one back support 14. The back support 14 may have a top side, bottom side, front face and back side. The body bag 10 may have a stay open collar 18 around the wind entry hole 44. The body bag 10 may have an interior housing. The wind entry hole 44 may be along a side of the body bag 10. The stay open collar 18 may allow for the wind entry hole 44 to remain open. The body bag 10 may substantially enclose the back support 14 and a side support 12. The side support 12 may attach to the back support 14. In certain embodiments, the side support 12 may be at a substantially perpendicular angle from the back support 14. The side support 12 may be foldable. A stake 20 may be connected to the body bag 10.

In certain embodiments, the decoy head 16 may include a decoy head slot 34 along a back side. The decoy head slot 34 may connect with a back support nub 32. The back support nub 32 may be along the front face of the back support 14. The back support 14 may also include a plurality of back support holes 26 along the top side and the bottom side of the back support 14. Along the front face of the back support 14 may be a back support clip lock 40 that may allow the decoy head 16 to be locked in place once the decoy head 16 is connected to the back support 14.

In certain embodiments, the side support 12 may include a plurality of side support arm nubs 28 and a set of side support thru holes 30. The plurality of side support arm nubs 28 may be positioned to attach to the back support 14. In certain embodiments, the plurality of side support arm nubs 28 may enter the plurality of back support holes 26 to secure the side support 12 to the back support 14. The set of side support thru holes 30 may be positioned to allow the stake 20 to connect to the side support 12 and be aligned with a side of the side support 12.

In certain embodiments, the stake 20 may be connected to the wind entry hole 44 of the body bag 10. The stake 20 may also be connected to the side support 12. The stake 20 may connect to the side support 12 through the stay open collar 18, fixing the body bag 10 to a specific location. A stopper 24 may be positioned along the stake 20 between the set of side support thru holes 30 of the side support 12. The side support 12 may be moved along the stake 20 to set an appropriate height. The stake 20 may have a threaded end 36. Once a height may be fixed, the stopper 24 may be moved to secure the stake 20 along the threaded end 36. A T-handle 22 may be placed on top of the stake 20 to keep the body bag 10 from sliding up and off the stake 20.

In certain embodiments, the side support 12 may collapse from the stake 20 and fold onto the back support 14 to allow ease of storage. The back support 14 may allow the side support 12 to connect and balance the movement in the wind. By providing the plurality of back support holes 26 for the side support 12 to connect to the back support 18, hunters may utilize slight changes to modify the balance point and change the direction the decoy faces slightly. The decoy head 16 may be connected directly to the back support 14 and into the front of the body bag 10, thus minimizing air escaping and keeping the decoy flying across the wind, similar to a weather vane. Sewn into the side of the body bag 10 using a material such as a polymer, such as neoprene and the like, the stay open collar 18 may ensure the wind entry hole 44 remains open to catch the wind from the side of the body bag 10. The stake 20 may be utilized and may be made of a material such as fiberglass or the like. It is envisioned that the back support 14 and the side support 12 may be manufactured to have various lengths and widths.

The present decoy may have a nearly airtight body bag 10 which catches the wind and fills the interior housing. The stay open collar 18 on the side of the body bag 10, instead of on the front end, allows the interior housing of the body bag 10 to fill from the side by the wind instead of the front end. This location of the stay open collar 18, may allow the present decoy to be placed where the side of the body bag 10 faces the wind, and not the front end of the body bag 10, and thus allows the present decoy to fly other than parallel to the wind, such as approximately perpendicular to the wind, or the like.

When assembled, the body bag 10 and decoy head 16 components of the present invention may allow the body bag 10 to fill with air, while the stay open collar 18 on the side of the body bag 10 may allow the decoy to do so from the side. The balance between the side support 12 and the back support 14 may ensure the decoy may be positioned across the wind as compared to standard decoys which ride facing the wind only. The stake 20, T-handle 22 and stopper 24 may maintain the position of the support system and decoy body bag 10 at the appropriate height along the stake 20.

A method of making the present invention may include the following. A user may connect the decoy head 16 to the back support 14 instead of the stake 20. The body bag 10 may be sealed to the decoy head 16 using an attachment such as elastic or the like in order to retain the air inside the interior housing of the body bag 10. The side support 12 may be connected to the back support 14 at a position which may balance wind evenly across the side of the decoy. The side support 12 may be connected to the stake 20 through the stay open collar 18 placed on the side of the body bag 10.

By constructing the body bag 10 with the stay open collar 18 on the side of the body bag 10 instead of the front of the body bag 10, and by connecting the back support 14 to a side support 12 placed to balance wind resistance evenly between the front and back of the decoy, the decoy may subsequently face across the wind instead of into it.

In certain embodiments, the stay open collar 18 may be placed at varying positions along the side of the body bag 10. The side support 12 may be connected to the back support 14 at precise balance points to maintain position of the decoy in the wind. Being able to move the stay open collar along the side of the body bag 10 may allow the decoy to set up at various angles to the direction of the wind. In alternate embodiments, additional back supports 14 may be fabricated to add a different type of decoy that may fly at an approximately 45 degree angle to the wind through the approximately 90 degree angle position of the present device.

Once assembled, whether using a left- or right-handed version of the present device, the user may place the decoy in the ground 38 randomly throughout a spread of standard windsock decoys. The more of the present device that may be incorporated into the spread, the more natural the spread may look as compared to a spread using only standard windsocks.

It should be understood, of course, that the foregoing relates to exemplary embodiments of the invention and that modifications may be made without departing from the spirit and scope of the invention as set forth in the following claims.

What is claimed is:

1. A multidirectional windsock style decoy comprising:
   a body bag having a front end and a wind entry hole along a side of the body bag;
   a stake attached to the wind entry hole along the side of the body bag; and
   at least one back support having a top side, a bottom side, a front face and a back side, wherein the at least one back support is substantially enclosed by the body bag, and wherein the at least one back support comprises a plurality of back support holes along the top side and the bottom side of the at least one back support; and.

2. The multidirectional windsock style decoy of claim 1, further comprising a stay open collar connected to an inner perimeter of the wind entry hole.

3. The multidirectional windsock style decoy of claim 1, further comprising a decoy head having a back side, wherein the decoy head connects with the body bag and closes off a decoy head hole at the front end of the body bag.

4. The multidirectional windsock style decoy of claim 3, wherein the back side of the decoy head connects to the front face of the at least one back support.

5. The multidirectional windsock style decoy of claim 1, further comprising a side support connected to the top side and the bottom side of the at least one back support.

6. The multidirectional windsock style decoy of claim 5, wherein the side support comprises a plurality of side support arm nubs, wherein the plurality of side support arm nubs connect the side support to the plurality of back support holes of the at least one back support.

7. A method for luring waterfowl to an area comprising:
placing at least one multidirectional windsock style decoy into a spread of decoys, wherein the multidirectional windsock style decoy comprises:
a body bag having a front end, a wind entry hole along a side of the body bag;
a stake attached to the wind entry hole along the side of the body bag;
at least one back support having a top side, a bottom side, a front face and a back side, wherein the at least one back support is substantially enclosed by the body bag, and wherein the at least one back support comprises a plurality of back support holes along the top side and the bottom side of the at least one back support; and
placing the multidirectional windsock style decoy to receive the air from the wind through the wind entry hole, wherein a line from the front end to the back end of the multidirectional windsock style decoy is other than parallel to the direction of the wind, wherein the at least one multidirectional windsock style decoy is directed to different angles randomly throughout the spread of decoys.

8. The method of claim 7, wherein the multidirectional windsock style decoy further comprises a stay open collar connected to an inner perimeter of the wind entry hole.

9. The method of claim 7, wherein the multidirectional windsock style decoy further comprising a side support connected to the top side and the bottom side of the at least one back support, wherein the stake connects to the side support.

10. The method of claim 7, wherein the multidirectional windsock style decoy further comprising a decoy head having a back side, wherein the decoy head connects with the body bag and closes off a decoy head hole at the front end of the body bag.

\* \* \* \* \*